Patented Jan. 12, 1937

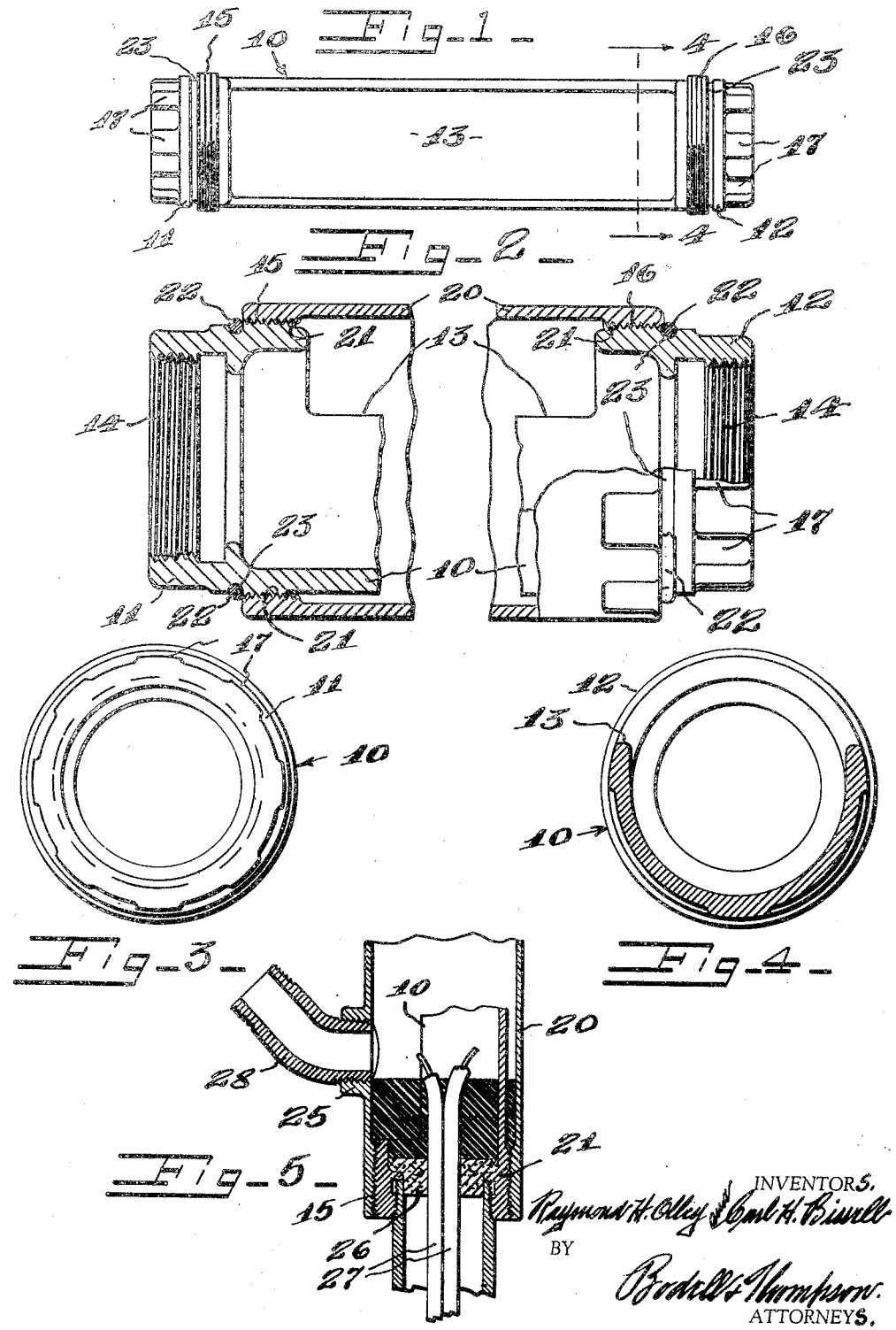

2,067,644

UNITED STATES PATENT OFFICE 2,067,644

PULL BOX

Raymond H. Olley and Carl H. Bissell, Syracuse, N. Y., assignors to Crouse-Hinds Company, Syracuse, N. Y., a corporation of New York Application July 29, 1935, Serial No. 33,653

4 Claims. (Cl. 247—15)

This invention relates, in general, to electrical conduit fittings, and more particularly to what is known as pull boxes.

To those familiar with the art, a pull box comprises a metallic fitting provided with means for attachment to the conduit line, and so constructed that the box may be opened to permit the pulling of wires, or cables, through the conduit and if desired, to permit the splicing of wires or cables. The fitting is of such construction that the work opening may be closed after the pulling of the wires, or splicing of the same.

An object of the present invention is a pull box comprising a rigid, one-piece body which may be initially included in the conduit run, or line, when the same is made up or installed.

Pull boxes in common use are constructed of a number of different parts, and the adjoining ends of the conduit line are not rigidly connected until after the work of pulling the wires, or splicing the cables, has been effected. The importance and desirability of a pull box which may be initially incorporated in the conduit run to form a continuous rigid conduit line will be readily appreciated by practical wiremen.

Another object of this invention is a pull box employing a one-piece, easily manipulated closure for the opening in the box.

Another object of the invention is means whereby the sleeve or closure for the box may be conveniently secured and held in place.

A further object of this invention is a pull box for electrical conduit lines which serves the dual purpose of a pull box and a sealing fitting, whereby the fitting may be used as a pull box, and after the pulling and/or slicing of the cables has been completed, the box may be used in a most convenient manner as a sealing fitting to seal off one part of the conduit run from the other.

The invention consists in the novel features and in the combinations and constructions hereinafter set forth and claimed.

In describing this invention, reference is had to the accompanying drawing in which like characters designate corresponding parts in all the views.

Figure 1 is a view, in elevation, showing the body member, the view comprising a top plan relative to the trough portion of the body.

Figure 2 is an axial sectional view, partly in elevation, and partly broken away, of the complete fitting.

Figure 3 is an end elevation of the body section shown in Figure 1.

Figure 4 is a cross sectional view of the body taken on lines 4—4, Figure 1.

Figure 5 is a lengthwise, sectional view of the fitting attached at one end to a conduit arranged in vertical position showing a sleeve of modified form.

The invention comprises generally, a pull box including a rigid body member formed with cylindrical end portions and being trough shaped, or provided with an elongated opening in one side thereof, intermediate the end portions, a removable cylindrical sleeve enclosing the body and forming a closure for the opening of the body, the end portions of the body being provided with means for attachment to a conduit line.

10 designates generally a one-piece, rigid body member provided with cylindrical end portions 11, 12. The central portion 13 of the body intermediate the cylindrical ends 11, 12, is formed trough shaped in cross section, as indicated in Figures 1 and 4. Or, in other words, the body 10 is provided with an elongated work opening in one side thereof extending, as here shown, from one cylindrical end portion to the other.

The end portions 11, 12, may be provided with any suitable means for attachment to a conduit. As here shown, the ends are threaded internally as at 14 to permit the ends of the conduit to be screwed into the body. However, the ends 11, 12, obviously could be provided with set screws, or threadless conduit connectors if desired.

The cylindrical end portions 11, 12, adjacent the ends of the opening in the body, are here shown as threaded externally as at 15, 16, the purpose of which will be described hereinafter. The outer part of the end portions 11, 12, may be provided with suitable corrugations or ribs 17 to provide a suitable wrench grip, while the body 10 is being secured to the ends of the conduits.

It will be observed that the one-piece, rigid body portion 10 is initially secured to the ends of the conduits, and the conduit line can accordingly be permanently installed in place, and the entire run of conduit completed. The side opening in the body provides a maximum work opening through which the wires, or cables, may be conveniently pulled and if desired, spliced.

A conveniently operable means is provided for closing the opening in the side of the body, being here shown in the nature of a cylindrical sleeve 20. The sleeve 20 is of such proportions in diameter and length as to enclose the body 10 with the ends of the sleeves coacting with the cylindrical ends of the body, the sleeve forming a closure over the opening in the body. The sleeve 20 is removably secured to the body 10. As here shown, the ends of the sleeve are provided with internal threads 21 complemental to the external threads 15, 16, on the end portions 11, 12, of the body 10. Preferably, these threads are formed in the nature of a running thread whereby the sleeve 20 may be conveniently sleeved over the body by threading the sleeve over either cylindrical end portion 11 or 12.

In non-hazardous and dry installations, the end portions 11, 12, of the body may be machined cylindrical instead of being threaded as at 15, 16, and the ends of the sleeve 20 may be bored to have a sliding fit relative to the machined outer portions of the ends of the body, whereby the sleeve 20 may be simply sleeved, or telescoped, over the body. However, where it is desired to have an explosion resisting fitting, the threaded joint is preferable.

Means is employed to prevent accidental displacement of the sleeve from the body. As here shown, this comprises a split ring 22 which snaps into an annular groove 23 formed adjacent the outer ends of the threads 15, 16, in the end portions 11, 12, of the body. A snap ring 22 may be employed at each end of the body. The groove 23 is semi-circular in cross section permitting a substantial portion of the ring 22 to extend radially outward to coact with the end of the sleeve 20. If desired, the sleeve 20 may be provided with a set screw, or other suitable holding means although we have found the snap ring preferable in actual practice.

In Figure 5 is shown a modified type of sleeve which is provided with a boss 25 formed with an aperture extending through the wall of the sleeve and being threaded internally. This type of sleeve is employed where it is desired to use the pull box as a sealing fittting to effectively seal off one section of the conduit run from the remainder of the run. When used in this manner, the lower end of the fitting, if the run be in vertical position, is packed with asbestos, or other suitable material 26 to prevent the sealing compound from passing around the conductors 27 to the lower part of the conduit run. A plumber's elbow 28 is then screwed into the boss 25, and the sealing compound is poured into the box, it being understood that the sleeve 20 is previously adjusted relative to the body 10 so that the opening in the boss 25 is in alinement with the elongated opening in the body 10. The sealing compound is poured in until it reaches a level at the bottom side of the aperture in the sleeve. The elbow 28 is then unscrewed, and a suitable plug screwed into the aperture of the sleeve. When the conduit line is horizontal, both ends of the fitting are packed with the asbestos, or suitable material, about the conductors 27, and the sealing compound is poured in until the fitting is filled.

The pull box is installed by attaching the ends of the conduit to the body 10, the sleeve 20 being slid over one of the conduit ends previously. After the wires, or cables, have been pulled through the conduit, the sleeve 20 is threaded over the body and secured in place.

It will be observed that we have devised a most practical and economical pull box consisting of a minimum number of parts and possesses many advantages over the pull boxes now in common use.

What we claim is:

1. A pull box for electrical conduit lines comprising a body trough shaped in cross section and being provided with cylindrical end portions, said end portions being formed with conduit receiving passages and being threaded externally, a cylindrical sleeve having internal threads complemental to the external threads on said end portions, said sleeve being removable axially from said body when the same is connected in the conduit line.

2. A pull box for electrical conduit lines comprising a body trough shaped in cross section and being provided with cylindrical end portions, said end portions being formed with conduit receiving passages and being threaded externally, a cylindrical sleeve having internal threads complemental to the external threads on said end portions, said sleeve being removable axially over either end of said body when the same is connected in the conduit line, means detachably carried by said end portions of the body and coacting with said sleeve to prevent removal of the same from the body.

3. A pull box for electrical conduit lines comprising a body trough shaped in cross section and being provided with cylindrical end portions, said end portions being formed with conduit receiving passages and being provided with external threads, a sleeve of greater length than the trough section of the body and being provided at its ends with internal threads complemental to the external threads on the end portions of the body, whereby said sleeve is removable axially from the body when the same is connected in the conduit line.

4. A pull box for electrical conduit lines comprising a body trough shaped in cross section and being provided with cylindrical end portions, said end portions being formed with conduit receiving passages and being threaded externally, a cylindrical sleeve of greater length than the trough section of the body and being provided at its ends with internal threads complemental to the external threads on the end portions of the body, and having an enlarged bore between the threaded ends, whereby said sleeve is removable axially from the body when the same is connected in the conduit line, and means cooperable with the end portions of the body and the ends of the sleeve to prevent relative axial movement between the sleeve and the body.

RAYMOND H. OLLEY.
CARL H. BISSELL.